April 14, 1925.
E. W. BLACK
ELECTRIC HEATER
Filed Feb. 15, 1924
1,533,090
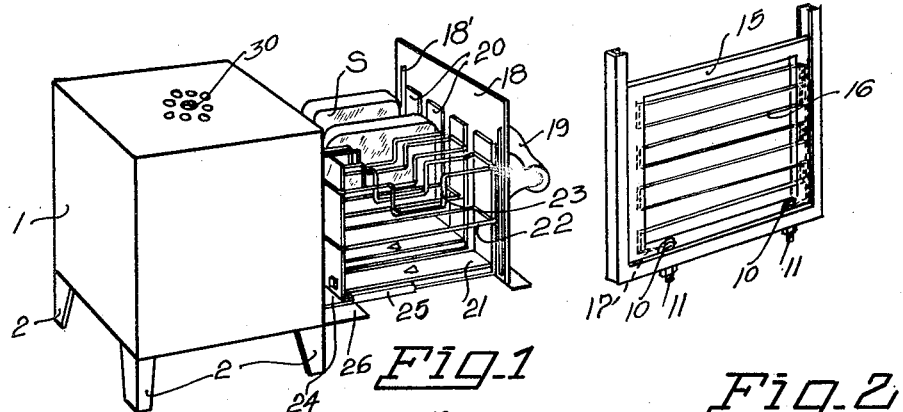
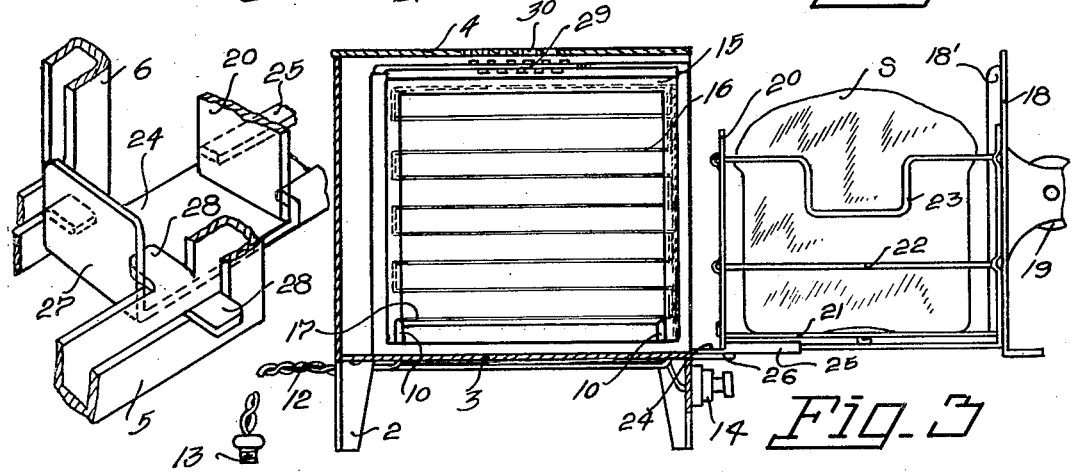
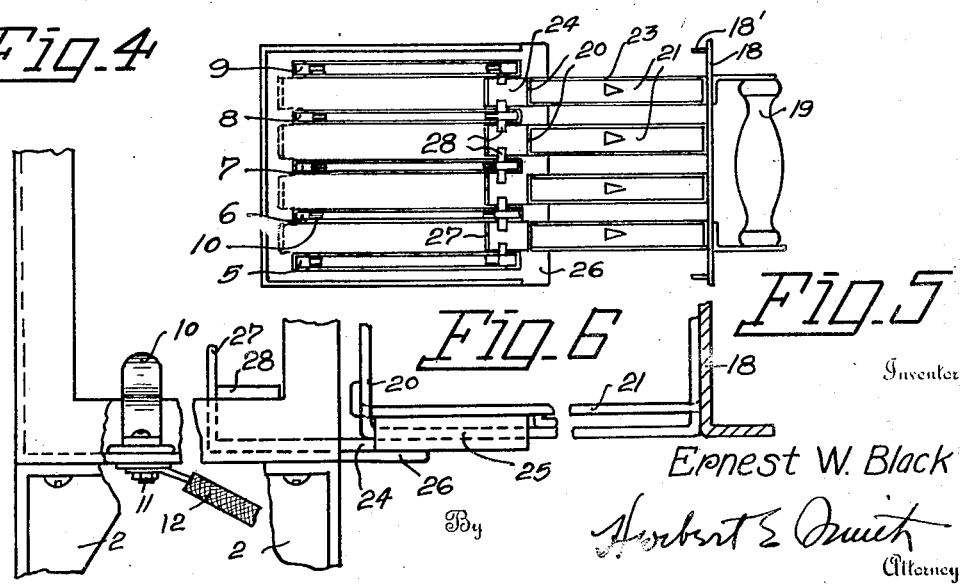
Inventor
Ernest W. Black
Attorney Patented Apr. 14, 1925.

1,533,090

UNITED STATES PATENT OFFICE.

ERNEST W. BLACK, OF SPOKANE, WASHINGTON.

ELECTRIC HEATER.

Application filed February 15, 1924. Serial No. 693,024.

*To all whom it may concern:*

Be it known that I, ERNEST W. BLACK, a citizen of the United States, residing at Spokane, in Spokane County, and State of Washington, have invented certain new and useful Improvements in Electric Heaters, of which the following is a specification.

My present invention relates to an improved electric heater of the portable type and designed especially for use as a toaster for bread, which may be conveniently used at the meal table and form an attractive and useful utensil of this character.

The primary object of the invention is the provision of a toaster that may be manufactured with facility and at a reasonable cost of production, and which may be repaired when necessary and maintained in correct working order at comparative slight expense. By the utilization of the heater of my invention economy in the consumption of electricity is secured because of the rapidity with which the bread is toasted; the slices of bread are toasted simultaneously and uniformly on both sides; and after toasting the bread may be kept in the heated device to maintain its warmed condition notwithstanding that the electricity has been cut off.

The invention consists in certain novel combinations and arrangements of parts involving a cabinet adapted for use as an oven and a slidably removable grid or support for a plurality of slices of bread, together with heating elements, and means for coaction between the slidable grid and the heating elements, as will hereinafter be more fully set forth.

In the accompanying drawings I have illustrated one complete example of the physical embodiment of my invention wherein the parts are combined and arranged in accordance with the best mode I have thus far devised for the practical application of the principles of my invention.

Figure 1 is a perspective view of the electric heater with the toasting grid withdrawn and adapted to receive the slices of bread for toasting.

Figure 2 is a perspective view of one of the detachable heating elements, shown in position in its holder.

Figure 3 is a vertical sectional view of the heater with the grid pulled out.

Figure 4 is an enlarged detail perspective view showing portions of two holders and a portion of the grid with the slide carrier and stop device therefor.

Figure 5 is a top plan view on a reduced scale with the cabinet top removed and showing the grid withdrawn therefrom.

Figure 6 is an enlarged detail view illustrating the stop device for the slidable grid.

In carrying out my invention as illustrated in its preferred form in the drawings I utilize a cabinet or casing 1 which may be insulated if desired and is fashioned in suitable manner to present an attractive appearance when used on the table. The cabinet is open at the front and stands upon its four corner legs 2, the bottom 3 being closed as is also the top 4.

Within the cabinet and extending longitudinally thereof are a number of spaced, parallel holders 5, 6, 7, 8, and 9, which afford four spaces therebetween. These heating-element holders are fashioned in U-shape of channel metal or other material and are secured to the bottom of the cabinet, each holder having at its ends pairs of transversely arranged spring clips 10, and through these retaining clips and the bottom of the cabinet terminal posts 11 extend. The spring arms of these retaining clips project above the top edges of the base of the channeled or grooved U-shaped holders as seen in Figures 2 and 6, and the lead wires 12 lead to the terminal posts 11. A connecting plug 13 is adapted to be inserted in a usual socket to secure the current of electricity, and the electric current is controlled by the switch 14 of suitable type at the front of the heating device.

In this instance five electric heating elements are used each consisting of a rectangular flat frame 15 of mica or other material adapted for the purpose, which frame is perforated for the reception of the resistance wire 16 threaded through these perforations in zig zag formation. The rectangular frame is adapted to slide down in its holder as seen in Figure 2, and the end wires 17 of the zig zag formation are adapted to contact with the spring arms of the clips 10. Thus the clips not only receive the detachable heating elements but they automatically make the connection for the electric circuit when placed in proper position. It will be apparent that two of the heating elements only are necessary for toasting a slice S on both sides, and under such conditions two only are used. As shown in the drawings four slices of bread may be toasted on both sides simultaneously.

The slidable grid or container for the slices of bread comprises a front plate 18 adapted to close the open front of the cabinet and fashioned with vertical side flanges 18' to fit snugly over the front edges of the side walls of the cabinet, and a handle 19 is attached to this front plate for convenience in manipulating the grid as it is pushed in or pulled out of the cabinet.

Attached at the inner side of the front plate are a series of parallel U-shaped frames 20 spaced equidistant apart and adapted to slide into the cabinet between adjoining holders and their heating elements. These frames are preferably of metal and formed with a slightly elevated bottom plate 21 parallel with the bottom member of the frame and adapted to support the slice S as seen in Figure 3. Each frame is provided with spaced horizontally arranged guard wires 22 for the slice of bread, and the upper guard wire may be fashioned with a bend 23 depending therefrom to lend additional support to the slice of bread to be toasted. The slice of bread of course is slipped into the frame from above when the grid is withdrawn as in Figure 3, and the toast is withdrawn through the open top of the frame.

Each toasting frame of the grid is connected with a pair of adjoining holders through the instrumentality of a slidable carrier 24 which has lateral flanges 25 that overhang the bottom bar of the U-shaped frame 20 and are located between this bar and the bottom plate 21 of the frame. The carriers are slidable along the face of the cabinet bottom and the grid frames are slidable with relation to the carriers thus permitting the entire withdrawal of the grid from the cabinet, a front extension 26 projecting from the bottom 3 of the cabinet as an additional support for the carriers and grid.

At its inner end each carrier is fashioned with an upright stop plate 27, which when the grid is pulled out encounters a pair of laterally projecting stop lugs 28 on adjoining electric heating-element holders, to prevent excessive movement of the grid or its entire withdrawal from the cabinet.

The lateral flanges 25 of the carriers prevent excessive relative movement of the grid and prevent the latter from being disengaged from the carriers.

For filling the grid with slices of bread the handle 19 is grasped and the grid pulled from the cabinet as in Figure 3, and after the slices have been put in place the grid is shoved into the cabinet and the control switch 14 is closed. As the slices are located between heating elements it will be apparent that they are toasted simultaneously and uniformly at both sides. If desired the toasted bread may be retained in the cabinet as a warming oven, after the current of electricity has been turned off at switch 14, and when ready for use the grid is pulled out and the toast is removed from the grid in usual manner.

If desired one or more of the central holders may be equipped with an auxiliary heating element as 29 in Figure 3, located just beneath the top of the cabinet which is vented at 30 with perforations for passage of heated air currents to a receptacle, as a coffee percolator placed on top of the cabinet.

It will be apparent that ordinary repairs may be made with facility to the heater, as for instance should a heating element burn out the defective member may readily be removed and a fresh one supplied to the holder without the necessity for skilled labor. The weight of the cabinet is sufficient and ample to support the grid when the latter is withdrawn free from the cabinet and in such position ready access may be had to the grid for placing the bread or removing the toast.

Having thus fully described my invention, what I claim as new and desire to secure by Letters Patent is—

The combination with an enclosing cabinet having an open front and spaced parallel U-shaped holders therein and detachable electric heating elements in said holders, of carriers located between adjoining holders and slidable relatively thereto, co-acting means on the carriers and holders for limiting movement of the former, a grid comprising a front plate and spaced toasting frames carried thereby adapted to pass between the heating elements, said toasting frames slidably supported in the carriers and means on the frames and carriers for limiting the movement of the former.

In testimony whereof I affix my signature.

ERNEST W. BLACK.